US006619161B1

(12) United States Patent
Blair

(10) Patent No.: US 6,619,161 B1
(45) Date of Patent: Sep. 16, 2003

(54) ANTI-TAMPER NUT

(75) Inventor: David William Blair, South Kilworth (GB)

(73) Assignee: Spiralock Corporation, Madison Heights, MI (US)

( * ) Notice: Subject to any disclaimer, the term of this patent is extended or adjusted under 35 U.S.C. 154(b) by 0 days.

(21) Appl. No.: 10/087,294

(22) Filed: Feb. 28, 2002

(51) Int. Cl.$^{7}$ .......................... B25B 13/02; F16B 35/04
(52) U.S. Cl. .......................................... 81/119; 411/427
(58) Field of Search ............................... 81/119, 121.1; 411/402, 410, 427, 429, 432; D8/382, 397

(56) References Cited

U.S. PATENT DOCUMENTS 255,459 A 3/1882 Rogers
3,482,481 A * 12/1969 Newell et al. .............. 411/402
3,908,489 A * 9/1975 Yamamoto et al. ........ 81/124.3
4,128,038 A 12/1978 Urwin ........................ 411/403
4,211,128 A 7/1980 Plumer ........................ 81/436
4,258,596 A 3/1981 Bisbing et al. ............... 81/436
4,302,137 A 11/1981 Hart ........................... 411/432
4,480,513 A 11/1984 McCauley et al. ............ 81/436
4,512,220 A 4/1985 Barnhill, III et al. ...... 81/121.1
4,618,299 A 10/1986 Bainbridge et al. ......... 411/374
4,649,620 A 3/1987 Omori ......................... 29/511
5,033,501 A 7/1991 Stehling ..................... 137/296
5,207,132 A 5/1993 Goss et al. ................... 81/460
5,277,531 A 1/1994 Krivec ....................... 411/403
5,370,486 A 12/1994 Plummer .................... 411/430
5,622,465 A 4/1997 Junkers ...................... 411/432
5,682,801 A * 11/1997 Waechter ................... 81/121.1
5,833,419 A 11/1998 Franciskovich et al. .... 411/403
6,045,311 A * 4/2000 Chang ........................ 411/402
6,186,718 B1 2/2001 Fogard ....................... 411/403
6,293,744 B1 9/2001 Hempfling et al. ...... 411/372.5
6,321,625 B1 * 11/2001 Fernandez ................. 81/176.2

* cited by examiner

*Primary Examiner*—Joseph J. Hail, III
*Assistant Examiner*—David B. Thomas
(74) *Attorney, Agent, or Firm*—Harness, Dickey & Pierce, PLC

(57) ABSTRACT

The present invention provides an anti-tamper nut that has a threaded bore and an angled outer surface. The angled outer surface has a plurality of ribs extending from a first face to a second face of the nut. A wrench adapted to mate with the outer surface of the nut rotationally drives the nut along the threads of a threaded member.

14 Claims, 3 Drawing Sheets

10 14 II 20 22 24 III 26 28 16 II 12 28 26

ANTI-TAMPER NUT

FIELD OF THE INVENTION

The present invention relates generally to an anti-tamper nut, and more particularly, to an anti-tamper nut that utilizes an angled surface and plurality of ribs to resist unauthorized removal.

BACKGROUND OF THE INVENTION

Conventionally, fasteners have been used in a wide array of applications that permeate every type of industry. Many types of fasteners exist that include a threaded portion, such as a bolt, and a nut that threads thereround. The nut usually has a series of flattened faces adapted to engage with parallel inner sides or a channel of a mating wrench for rotatably securing and unsecuring the nut to the threaded member.

In many instances, it is desirable that unauthorized individuals are unable to remove the nut, and that only specified individuals have the ability for removal. Such instances are widely found in automotive component applications. To prevent auto theft and auto component theft, vehicle and vehicle component manufacturers many times design fasteners requiring a specific wrench, similar to a key, to remove the fastener. The wrench can then be provided to the vehicle owner, so that the vehicle owner can remove the fastener when required to change tires or other components on the vehicle. In some instances, the vehicle manufacturer retains the wrench to prohibit the vehicle owner from removing or tampering with the fastener, as improper adjustment of engine or other components can cause damage.

While this has served well to prevent unauthorized tampering, drawbacks exist. Specifically, unauthorized individuals have attempted to remove or adjust fasteners even when prohibited to do so by the owner or manufacturer. To accomplish this, unauthorized individuals sometimes use pipe wrenches, pliers, or other high force devices to grip the outer surface of the nut with sufficient pressure to generate friction and allow unfastening of the nut from the threaded member. As a result, components have been damaged due to improper adjustment of the fastener, or worse, stolen by an unauthorized individual. The present invention was developed in light of these and other drawbacks.

SUMMARY OF THE INVENTION

To address these and other drawbacks, the present invention provides a device for securing a first element to a second element that uses a nut. The nut has the large face disposed parallel to and opposite from a small face. The outer circumference of the large face is connected to the small face by an outer surface. The outer surface is tapered. A bore disposed through the center of the nut that has a plurality of threads for securing to a threaded member. A plurality of ridges extend from the large face to the small face along the outer surface at the same taper angle as the outer surface. As a result, the angled outer face makes it difficult for tools such as pliers, vice grips or pipe wrenches to be used by an unauthorized user for removing the nut.

In another aspect, a kit having component parts includes a nut having a tapered outer surface and a threaded bore, and a wrench adapted to engage the outer surface of the nut. In this way, only users possessing the wrench can attach or remove the nut from a thread member.

In yet another aspect of the present invention, an assembly is provided comprising a first element attached to a second element. The threaded member extends from a face of the first element and through an aperture in the second element. The second element has a first face abutting the face of the first element and a second face disposed opposite the first face. A nut is threaded to the threaded member and clamps against the second face of the second element. The nut includes an angled outer surface and a threaded bore extending therethrough. As a result, the second element is clamped between the nut and the first element and the tapered outer surface of the nut prevents unauthorized users from adjusting or removing the nut on the threaded member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
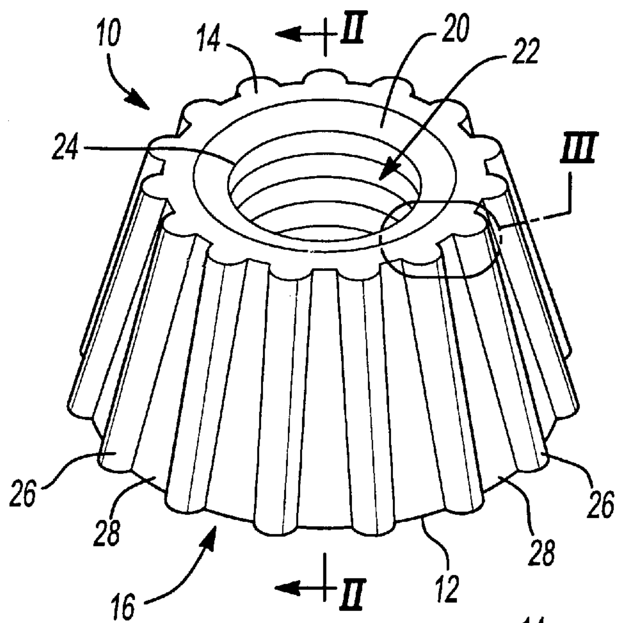
FIG. 1 is a perspective view of an anti-tamper nut according to the present invention.
Figure 2:
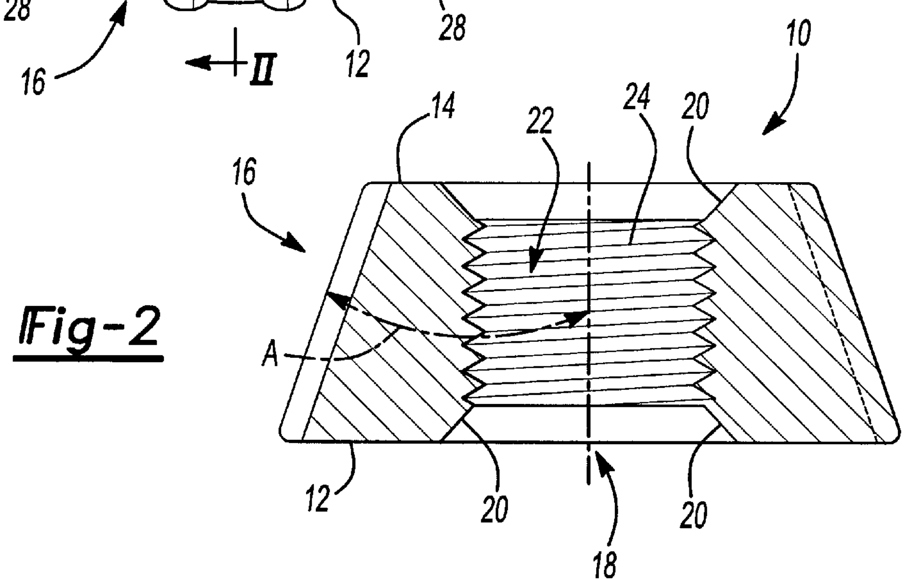
FIG. 2 is a cross-sectional view of an anti-tamper nut along II—II in FIG. 1 according to the present invention.

Referring now to FIG. 1 and FIG. 2, an anti-tamper nut 10 according to the present invention is shown and described. Anti-tamper nut 10 has a large face 12 disposed in a parallel relationship with a small face 14. An angled outer surface 16 is defined by the surface that extends, in an increasing diameter, from small face 14 to large face 12. Through bore 18 generally includes a central threaded portion 22 extending through the center of anti-tamper nut 10. Central threaded portion 22 has a series of threads 24 for threadingly engaging a mating bolt member (as will be discussed in greater detail with respect to FIG. 7), which can include right handed or left handed threads. Through bore 18 extends through the anti-tamper nut 10 and terminates at large face 12 and small face 14. Chamfers 20 are provided that connect each face to through bore 18 and assist in alignment of anti-tamper nut 10 with a mating screw member as well as reducing corner stresses.

Referring to FIG. 1, angled outer surface 16 is shown having a plurality of raised portions 26 connected by valleys 28. Each raised portion 26 is preferably rounded and preferably number 15 in total. Each raised portion 26 and valley 28 are angled at an angle of inclination as described for angled outer surface 16. Preferably, the angle of inclination A of angled outer surface 16 is nineteen degrees. However, the angle of inclination can be angled at any angle greater than zero degrees. Specifically, the angle of inclination A can be 1 through 89 degrees.

Moreover, the greater the angle of inclination, the less probable that a device such as a pipe wrench, vice grips or channel locks can be used by an unauthorized person to grip outer surface 16 and remove anti-tamper nut 10 from a bolt.

Figure 3:
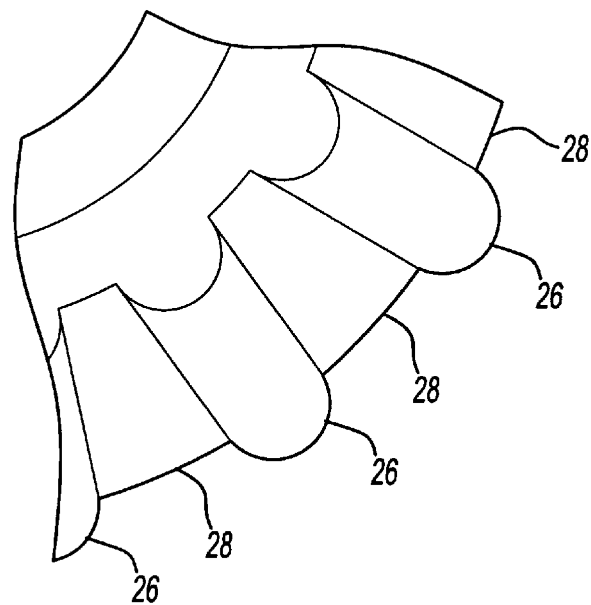
FIG. 3 is an exploded view of III in FIG. 1 according to the present invention.

Referring now to FIG. 3, a magnified view of III in FIG. 1 is shown and described. In FIG. 3, raised portions 26 are shown as rounded bumps and valleys 28 are illustrated as flat connecting portions. These portions 26 preferably have a radius of 0.6–0.7 millimeters. The rounded surface, again, helps ensure that only an accompanying wrench used by an authorized individual is able to remove anti-tamper nut 10 from a threaded member such as a bolt. However, it is also possible to use other shapes for raised portion 26, including other rounded shapes, triangular shapes and trapezoidal shapes as all of these shapes have angled edges that allow slip if anything other than a matching wrench is used. Additionally, as the use of a rounded or angled shape is a preferred embodiment, the use of rigid or flat shapes including squares or rectangulars can also be used.

Figure 4:
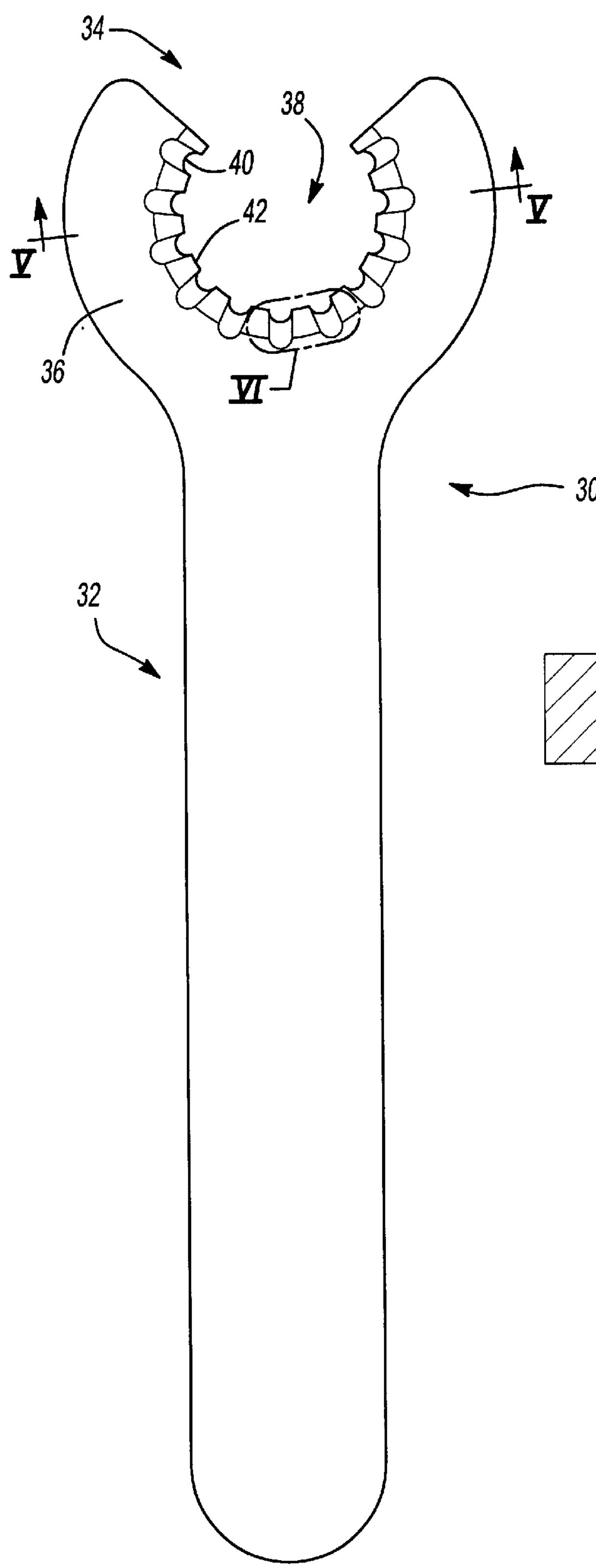
FIG. 4 is a top view of an anti-tamper nut removal device according to the present invention.

Referring now to FIG. 4, an anti-tamper attachment and removal device 30 is shown and described. Anti-tamper attachment and removal device 30 includes an arm 32 and a mating portion 34. Mating portion 34 includes a nut engagement area 36 and a tooth portion 38. Nut engagement area 36 provides structural support to tooth portion 38 when engaged with anti-tamper nut 10 (as will be described) and is preferably forged or machined as one piece with arm 32. Tooth portion 38 has a plurality of depressions 40 and connection areas 42. Depressions 40 are preferably circular and match the radius of curvature of raised portions 26 of anti-tamper nut 10. However, it is noted that the shape of depressions 40 are any shape required to match the shape of raised portions 26. Accordingly, if raised portions 26 are triangular, then depressions 40 will be an inverse triangular shape. Likewise, connection areas 42 are preferably flat and match the profile of valleys 28 of anti-tamper nut 10. The spacing between the center lines adjacent depressions 40 preferably positions each depression 40 over a respective raised portion 26 such that the entire tooth portion 38 engages angled outer surface 16 of anti-tamper nut 10.

Figure 5:
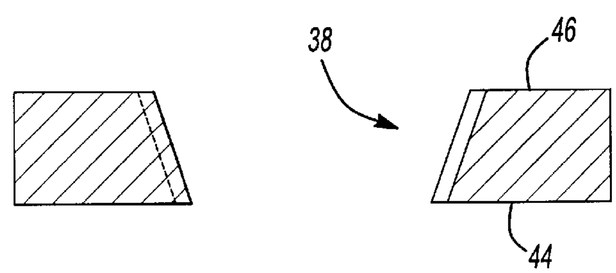
FIG. 5 is a cross-sectional view through V—V in FIG. 4.
Figure 6:
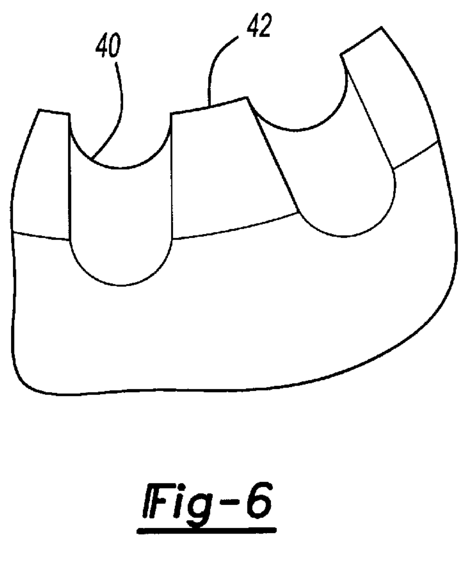
FIG. 6 is a magnified view of VI in FIG. 4.

Referring to FIG. 6, a magnified view of depressions 40 and connection areas 42 is shown. Referring to FIG. 5, tooth portion 38 generally defines an inner diameter of nut engagement area 36. As shown, nut engagement area 36 has a first face 44 and a second face 46. The angle of tooth portion 38 connecting first face 44 to second face 46 preferably matches the angle of angled outer surface 16 as described previously. As shown in FIG. 4, nut engagement area 36 has an opening area at the mating portion 34 of the anti-tamper attachment and removal device 30 to allow easier access to anti-tamper nut 10. However, it is noted that the degree of this opening can vary from that shown in FIG. 4 and can be completely closed. Preferably, as many raised portions 26 of anti-tamper nut 10 as possible are engaged by tooth portion 38 to reduce the amount of force on each individual raised portion 26. Therefore, the more closed the opening area is, the more raised portions 26 are engaged by tooth portions 38.

Figure 7:
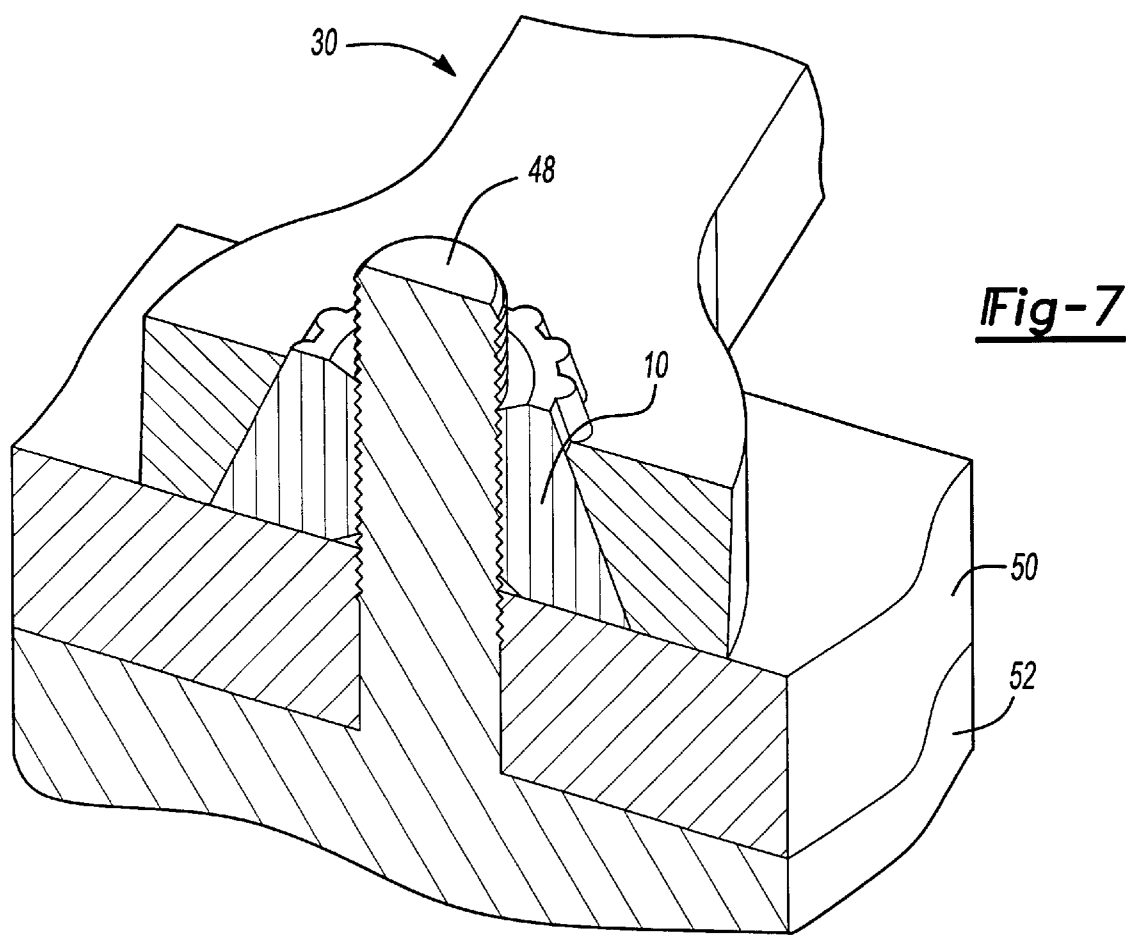
FIG. 7 is a cross-sectional view of an anti-tamper nut, anti-tamper nut attachment device and bolt member in operation according to the present invention.

Referring now to FIG. 7, the attachment of anti-tamper nut 10 to a threaded member 48 by using the anti-tamper attachment and removal device 30 is shown and described. In a non-limiting example of FIG. 7, anti-tamper nut 10 is threadingly attached to threaded member 48 to secure first element 50 to second element 52. Threaded member 48 is a bolt or other fastening member and is attached to second element 52. Threaded member 48 extends perpendicularly from the face of second element 52 and passes through an aperture in first element 50. During attachment, anti-tamper nut 10 is started on the threads of threaded member 48 by using chamfer 20 as a guide for alignment. Once anti-tamper nut 10 is started on the threads of threaded member 48, tooth portion 38 of anti-tamper attachment and removal device 30 is mated with angled outer surface 16 of anti-tamper nut 10. Once mated, anti-tamper attachment and removal device 30 is rotated to drive anti-tamper nut 10 along threads of threaded member 48. The interference between each depression 40 and respective raised portion 26 provides the requisite interference to transmit force from anti-tamper attachment and removal device 30 to anti-tamper nut 10. For removal, anti-tamper attachment and removal device 30 is rotated in an opposite direction to unscrew anti-tamper nut 10 from threaded member 48.

As a result of having a plurality of raised portions 26, if an unauthorized user attempts to drive only one or two of the raised portions with a tool such as vice grips, the large amount of pressure over the small area of one or two raised portions 26 will leave marks therein. Accordingly, either the manufacturer or the vehicle owner will realize by the markings that an unauthorized individual has attempted to adjust the torque on the anti-tamper nut 10. Moreover, as angled outer surface 16 is angled, a device such as vice grips or pliers, having flattened faces, will be unable to grip the angled face of anti-tamper nut 10. Lastly, the rounded surface of each raised portion 26 makes it difficult to use a device such as a screw driver to attempt to remove anti-tamper nut 10.

Figure 8:
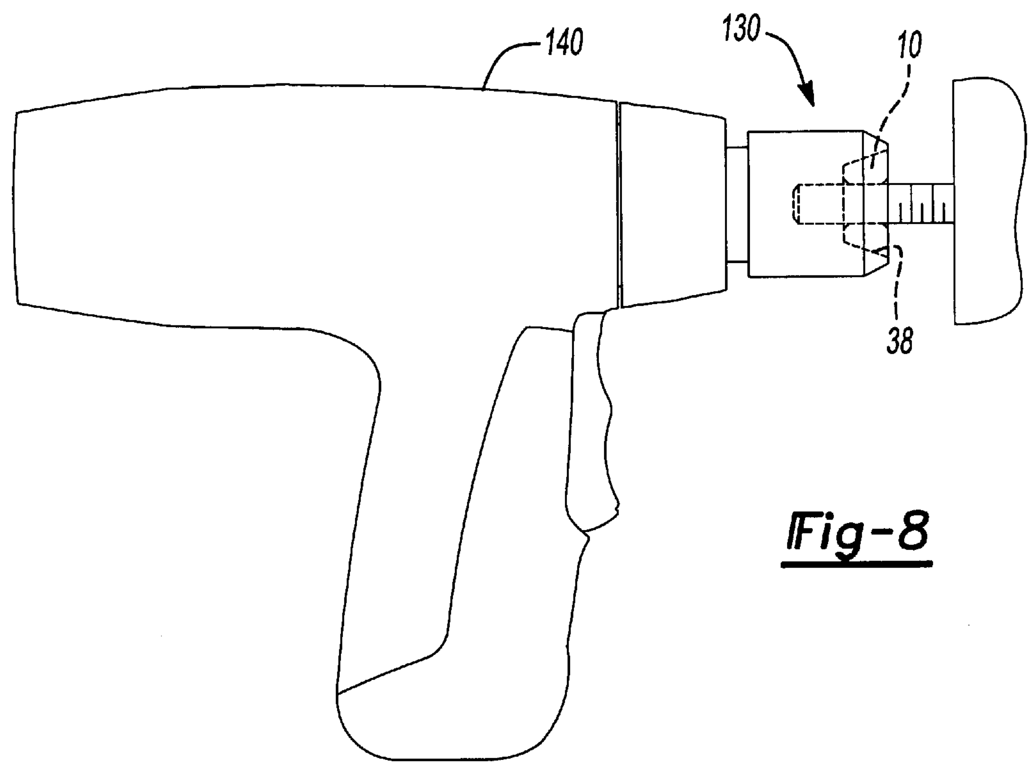
FIG. 8 is a side view of a second embodiment of an anti-tamper attachment and removal device according to the present invention.

FIG. 8 illustrates a second embodiment of an attachment and removal device 130. Here, attachment and removal device is depicted as a socket that fits to a impact or air wrench 140. An opposite end of the attachment and removal device 130 is engaged with anti-tamper nut 10. The attachment and removal device 130 has a tooth portion 38 having a similar structure as described above. Accordingly, rotation of the attachment and removal device 130 by the impact or air wrench 140 causes rotation of the anti-tamper nut 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A nut for securing a first element to a second element, the nut comprising:

a large circular face;

a small circular face disposed opposite to said large circular face;

an outer surface connecting an outer edge of said large circular face to an outer edge of said small circular face, said outer surface having an angle of inclination with respect to an axis of rotation of said nut, said angle of inclination increasing from said small circular face to said large circular face;

a threaded bore passing through and formed in said nut for threadingly engaging a threaded member; and a plurality of cylindrical portions outwardly disposed along said outer surface and extending between said small circular face and said large circular face in a direction so as to intersect a central axis of the nut.

2. The nut as claimed in claim 1, wherein said number of cylindrical portions is fifteen, each of said cylindrical portions being equally spaced around said outer surface.

3. A kit having component parts capable of being engaged for attaching a first element to a second element, the kit comprising the combination of:

a nut having a threaded bore and a tapered outer surface, said tapered outer surface having a plurality of cylindrical portions outwardly extending from a first surface of said nut to a second surface of said nut in a direction so as to intersect a central axis of said nut; and an anti-tamper attachment and removal device having a nut engagement area, said nut engagement area having a cut out section, a tooth portion disposed along an area of said nut engagement area forming said cut out section, said tooth portion angled to match an angle of inclination of said outer surface of said nut, said tooth portion adapted to engage said outer surface of said nut for allowing said nut engagement area to drive said nut in a rotational direction.

4. The kit as claimed in claim 3, wherein said anti-tamper attachment and removal device further comprises an arm extending outward from an axial center of said cut out section.

5. The kit as claimed in claim 3, wherein said anti-tamper attachment and removal device is a socket for a power tool.

6. An assembly comprising:

a first element;

a second element having an aperture, said second element having a first surface proximate said first element and a second surface oppositely disposed from said first surface;

a threaded member extending from said first element and passing through said aperture in said second element; and a nut having a threaded bore and a tapered outer surface, said nut having a large face and a small face, said large face abutting said second surface of said second element said tapered outer surface having a plurality of cylindrical portions outwardly disposed thereon in a direction so as to intersect a central axis of said nut, said threaded bore threadingly engaged to said threaded member to clamp said second element between said first element and said nut.

7. The assembly as claimed in claim 6, wherein said plurality of cylindrical portions are evenly distributed around said tapered outer surface.

8. The assembly as claimed in claim 7, wherein said number of cylindrical portions is at least 15.

9. The assembly as claimed in claim 6, further comprising an anti-tamper attachment and removal device having a tooth portion adapted to mate with said tapered surface of said nut for providing rotation of said nut.

10. The assembly as claimed in claim 9, wherein said anti-tamper attachment and removal device is a wrench.

11. The assembly as claimed in claim 9, wherein said anti-tamper attachment and removal device is a socket for a power tool.

12. The nut of claim 1, wherein said threaded bore connects to said small and large face through tapered surfaces extending radially outwardly from said bore to said respective small and large face.

13. The kit of claim 3, wherein said threaded bore connects to said first and second surface of said nut through tapered surfaces extending radially outwardly from said bore to said respective first and second surface.

14. The assembly of claim 6, wherein said threaded bore connects to said small and large face through tapered surfaces extending radially outwardly from said bore to said respective small and large face.

* * * * *